United States Patent [19]
Anell

[11] Patent Number: 5,905,950
[45] Date of Patent: May 18, 1999

[54] METHOD AND APPARATUS FOR PROVIDING FIXED CELLULAR FUNCTIONALITY

[75] Inventor: Carl Richard Anell, Solna, Sweden

[73] Assignee: Telefonaktienbolaget L M Ericsson, Stockholm, Sweden

[21] Appl. No.: 08/932,346

[22] Filed: Sep. 17, 1997

Related U.S. Application Data

[63] Continuation of application No. 08/501,531, Jul. 12, 1995.

[51] Int. Cl.$^6$ .................................................. H04M 11/00
[52] U.S. Cl. ......................... 455/421; 455/67.1; 455/437
[58] Field of Search ..................................... 455/421, 422, 455/432, 433, 435, 437, 456, 517, 524, 67.1, 67.6

[56] References Cited

U.S. PATENT DOCUMENTS

| 4,475,010 | 10/1984 | Huensch et al. . |
| 4,939,766 | 7/1990 | Umemoto et al. ...................... 455/421 |
| 5,127,042 | 6/1992 | Gillig et al. ............................... 379/59 |
| 5,179,559 | 1/1993 | Crisler et al. .............................. 379/60 |
| 5,210,785 | 5/1993 | Sato et al. ................................. 379/58 |
| 5,307,400 | 4/1994 | Sawyer et al. ............................ 379/59 |
| 5,309,502 | 5/1994 | Hirai ......................................... 379/59 |

(List continued on next page.)

FOREIGN PATENT DOCUMENTS

| 0505106 A2 | 9/1992 | European Pat. Off. . |
| 0568824 A3 | 11/1993 | European Pat. Off. . |
| 0601293 A2 | 6/1994 | European Pat. Off. . |
| 0616457 A1 | 9/1994 | European Pat. Off. . |
| 2-56127 | 2/1990 | Japan . |
| 3-182129 | 8/1991 | Japan ................................... 455/67.7 |
| 4-122134 | 4/1992 | Japan . |
| 5-244086 | 9/1993 | Japan . |
| 6-97880 | 4/1994 | Japan . |
| 6-189359 | 7/1994 | Japan . |
| WO92/02105 | 2/1992 | WIPO . |
| WO93/13618 | 7/1993 | WIPO . |
| WO93/19560 | 9/1993 | WIPO . |

OTHER PUBLICATIONS

Homayoun Hashemi, Kiomars Anvari, and Mahmoud Tabiani, "Application of Cellular Radio to Telecommunication Expansion in Developing Countries", Orlando Globecom '92, IEEE Global Telecommunications Conference, publ. Jun. 12, 1992, vol. 1, Sessions 1–18, pp. 1–648; vol. 2, Sessions 19–36B, pp. 649–1254; vol. 3, Sessions 37–54, pp. 1255–1920.

William Whitfield Smith, Jr., IEEE 1991, "Passive Location of Mobile Cellular Telephone Terminals", pp. 221–225.

M. Ballard and E. Issenmann, European Transactions on Telecommunications and Related Technologies, Jan./Feb. 1990, No. 1, Milano, IT, "Digital Cellular Mobile–Radio System ECR900", pp. 17–30.

Enrico Del Re, University of Florence, Department of Electronics Engineering, Italy, "An Integrated Satellite–Cellular Land Mobile System for Europe", pp. 1–7.

Horst Mayr–Stein and Günter Raab, International Switching Symposium Conference, Munich, Germany, Sep. 9–13, 1974, "A Flexible Communications System for Special Mobile and Stationary Use", pp. 524/1–524/5.

Primary Examiner—Nguyen Vo
Assistant Examiner—Sam Bhattacharya
Attorney, Agent, or Firm—Jenkens & Gilchrist, P.C.

[57] ABSTRACT

A method and apparatus for providing fixed telephony service in a mobile cellular telecommunications system is disclosed. In the invention a fixed subscriber is assigned a fixed area within a cellular system and may not move beyond the fixed area. The restriction on movement is accomplished by monitoring a location area identity (LAI), a timing advance (TA) value and a handover candidate cell list for the fixed subscriber. Monitored parameters are then compared with a fixed LAI, a fixed TA and a fixed handover candidate cell list to determine if the fixed subscriber has moved beyond the fixed area. If the comparison indicates movement has occurred, a violation signal is generated.

19 Claims, 4 Drawing Sheets

U.S. PATENT DOCUMENTS

| | | | |
|---|---|---|---|
| 5,327,575 | 7/1994 | Menich et al. | 455/33.2 |
| 5,353,331 | 10/1994 | Emery et al. | 379/58 |
| 5,353,332 | 10/1994 | Raith et al. | 379/59 |
| 5,367,558 | 11/1994 | Gillig et al. | 379/59 |
| 5,373,548 | 12/1994 | McCarthy | 455/33.2 |
| 5,379,447 | 1/1995 | Bonta et al. | 455/33.2 |
| 5,394,158 | 2/1995 | Chia | 342/457 |
| 5,400,390 | 3/1995 | Salin | 379/59 |
| 5,400,392 | 3/1995 | Nagashima et al. | 379/60 |
| 5,644,620 | 7/1997 | Shimura | 455/421 |

METHOD AND APPARATUS FOR PROVIDING FIXED CELLULAR FUNCTIONALITY

This application is a continuation of application Ser. No. 08/508,531, filed on Jul. 12, 1995, which was abandoned upon the filing hereof.

BACKGROUND OF THE INVENTION

1. Field of the Invention

This invention relates to cellular telecommunications systems and, more particularly, to a method and apparatus for providing fixed telephony service in a mobile cellular telecommunications system.

2. History of the Prior Art

In a cellular telecommunications system the user of a mobile station communicates with the cellular system through a radio interface while moving about the geographic coverage area of the system. The radio interface between the mobile station and cellular system is implemented by providing base stations dispersed throughout the coverage area of the system, each capable of radio communication with the mobile stations operating within the system. In a typical cellular system each base station of the system controls communications within a certain geographic coverage area termed a cell, and a mobile station which is located within a particular cell communicates with the base station controlling that cell. A cellular system is typically connected to the public switched telephone network (PSTN) or other similar landline phone system.

Radio technology has also for some time been used to provide a radio interface for fixed telephony service. In fixed telephony service, as opposed to mobile service, a subscriber remains in one location and does not move throughout the coverage area of the system providing the service. Noncellular systems providing fixed telephony services are generally referred to as Radio in the Local Loop (RLL) systems. In an RLL system, subscriber equipment usually comprises radio hardware having a radio interface to the RLL system and, an interface that accepts conventional telephone equipment through which the subscriber communicates with the RLL system. RLL systems are not capable of providing cellular functionality. As was the case for cellular systems, a typical RLL system is connected to the PSTN or other similar landline phone system. Preferably, the effect of using a radio interface is transparent and the subscriber does not notice that he or she is using a telephone which accesses the phone system through radio. Traditionally, RLL systems have been implemented mostly using analog radio systems.

A system operator desiring to provide fixed telephony service using RLL may implement the service using a system that is uniquely designed to provide only fixed telephony. As an alternative the system operator may implement the service using a mobile cellular telephone system to provide switching and radio access. If a digital cellular system is used this is referred to as digital wireless local loop (DWLL). If the system operator has an existing cellular phone system available the alternative may be preferred.

Implementation of fixed telephony services in an existing cellular system is typically done by providing the fixed subscriber with equipment differing from the equipment provided to a mobile subscriber. Since it is not necessary to provide portability to the degree necessary for a mobile subscriber, the fixed terminal is normally heavier and may be much larger than portable equipment. This type of terminal may be fixed in position, such as, for example, a pay phone is fixed to a structure. It is also possible that the fixed subscriber is provided a portable mobile station but the subscriber is restricted by agreement to remain within a certain fixed area of the cellular system while using the system. In this case the fixed subscriber may be restricted to a certain cell or smaller area within a cell. In both of the above cases, operators of a cellular system can provide simultaneous fixed and mobile service to different subscribers and allow easy upgrading of a subscriber's service from fixed to mobile.

One application of fixed telephony provided within a cellular system would be in developing countries where no landline telephone infrastructure exists.

Since a fixed subscriber does not move about the system, a fixed subscriber has a predictable effect on system radio channel allocation requirements. For example, a fixed subscriber will always access radio channels allocated to its assigned area. A fixed subscriber also uses less of certain switching resources than a mobile subscriber. For example, the fixed subscriber does not move from cell to cell so handoff switching resources are not required.

The predictability of the effect of fixed subscribers on radio channel allocation requirements allows a system operator to assign radio channels and equipment resources of a cellular system accordingly. For these reasons the system operator may charge a fixed subscriber a reduced rate as compared to a mobile subscriber.

In the above described fixed telephony within a cellular system, the system operator has an interest in assuring that a fixed subscriber remains fixed, i.e., remains fixed in position, or fixed within an assigned fixed subscriber area within the cellular system during use. If fixed subscriber services are implemented into the system with a minimum of system modification and fixed subscribers are registered in the system in a manner similar to and have similar equipment to mobile subscribers, the system operator may not always depend upon the lack of portability of the fixed terminal or the subscriber's adherence to an agreement to assure that the subscriber remains in place. In this type of implementation a fixed subscriber could conceivably modify a fixed terminal or break his agreement with the system operator and move out of his assigned fixed area. It would then be desirable to detect and prevent fixed subscriber movement from occurring at the outset rather than use system subscriber records to track down violators.

In mobile cellular systems the system keeps track of a mobile subscriber's position. In most systems this is done by registering the mobile subscriber in a location area that comprises one or more cells. When the subscriber moves to a new location area, registration in the new location area takes place. The registration is accomplished by the exchange of signals transmitted between the mobile subscriber's terminal and the base station, or base stations, controlling the newly entered location area. The registration process basically involves informing the mobile services switching center (MSC) controlling the newly entered location area of the mobile station's identity and then receiving a confirmation message from the system indicating that the system has registered the mobile station in the new location area.

One solution to the problem of inhibiting fixed subscriber movement in a cellular system would be to inhibit the movement of the fixed subscriber to a particular location area by inhibiting the registration process in all other location areas. However, the cells of a system and the location areas comprising these cells can be of considerable size.

Inhibiting registration to a single location area would not prevent supposedly fixed subscriber from moving within that location area.

Another solution to the problem of restricting a fixed subscribers movement could be to inhibit the handover function for the fixed subscriber. The handover function is provided in most cellular systems and allows a subscriber engaged in a call to move from a cell under the control of one base station to a second cell under the control of a second base station, while maintaining communications with the system. If the handover function were to be disabled for a subscriber, it would achieve the effect of pinning a subscriber to one cell, the one cell being the cell within which a call was initiated. However, disabling the handover function would not prevent the subscriber from moving to another cell and initiating a new call. By doing so the subscriber could move from his assigned fixed area and use the system.

Also, in some systems it may be desirable to have a handover function for fixed subscribers. This would be the case, for example, in systems where there is an overlaid cell structure with smaller cells within larger cells, each sharing coverage areas. In this situation, when system traffic requires, it may be desirable to handover calls for a fixed subscriber from a overlaying cell to the smaller cell within the larger encompassing cell or vice versa. Having the handover function available for all subscribers within a system would also allow easy upgrading of services from fixed to cellular.

It would provide an advantage then to have a method and apparatus for providing fixed telephony in a cellular telecommunications system, that restricted a fixed subscriber using any type of subscriber station to an area smaller in size than a system location area. It would provide a further advantage if the method and apparatus did not require inhibition of the handover function for system subscribers, easing simultaneous provision of both fixed and cellular services within the same system. Such a method and apparatus would provide the benefits of fixed telephony without the problems associated with the existing methods of restricting a subscriber's movement.

SUMMARY OF THE INVENTION

The present invention provides a method and apparatus for providing fixed telephony services within a cellular system. The invention operates to allow the benefits of fixed telephony in a cellular system while avoiding the problems of existing methods of restricting a subscriber's movement. The invention operates to restrict a fixed subscriber station to a fixed area assigned to the subscriber within the cellular system. The fixed area may be defined to be smaller than a single cell or location area, and, thus the invention provides a more efficient method of restricting movement than simply restricting registration to a single location area would. The invention does not require inhibition of the handoff function for a fixed subscriber. This avoids the problem of the fixed subscriber being able to circumvent a handoff inhibit by moving to a new cell and initiating a new call from that cell. It also allows the handover function to be utilized for a fixed subscriber when overlaid cells are used in the system and allows simultaneous provision of both cellular and fixed services within the system.

The restriction on movement is accomplished by monitoring system parameters that are associated with the fixed subscriber station within the system. The monitored parameters include the location area identity (LAI) of the location area in which the fixed subscriber is located, the timing advance (TA) value for the fixed subscribers uplink, and a handover candidate cell list created for the fixed subscriber. The handover candidate cell list contains a list of preferred candidate cells, ordered according to preference for handover, if handover were to be made from the cell in which the fixed subscriber is located.

In the invention a fixed subscriber is permanently assigned a fixed LAI, maximum TA (TA max) and minimum TA (TA min) value, and a fixed handover candidate cell list. These permanently assigned values may be assigned by the system upon initial power up of the fixed subscriber within the assigned fixed area. During system access and when the fixed subscriber station is on and idle, the actual LAIs and TAs are monitored and compared with the fixed LAI, TA max and TA min, assigned to the fixed subscriber. If the fixed and actual LAIs differ or, if the actual TA is not between TA max and TA min, a violation report is sent to a control means. The control means then evaluates the violation signal according to an algorithm defined by the system operator. After receiving one or more violation signals the control means may either alert the system operator of the fixed subscriber's movement or, automatically terminate system access for the fixed subscriber.

During an ongoing call the actual LAI, TA and handover candidate cell list are compared with the fixed LAI, TA max and TA min, and the fixed handover candidate cell list assigned to the fixed subscriber. If the fixed and actual LAIs differ, if the actual TA is not between TA max and TA min or, if a certain number, or greater, of cells have either changed in position or dropped from the fixed list as compared to the actual lists, a violation signal is sent to the control means. The control means evaluates the violation signal according to an algorithm defined by the system operator. After receiving one or more violation signals the control means may either alert the system operator that the fixed subscriber has moved beyond the fixed area, or automatically terminate the ongoing call and access by the fixed subscriber to the system.

DETAILED DESCRIPTION

Figure 1:
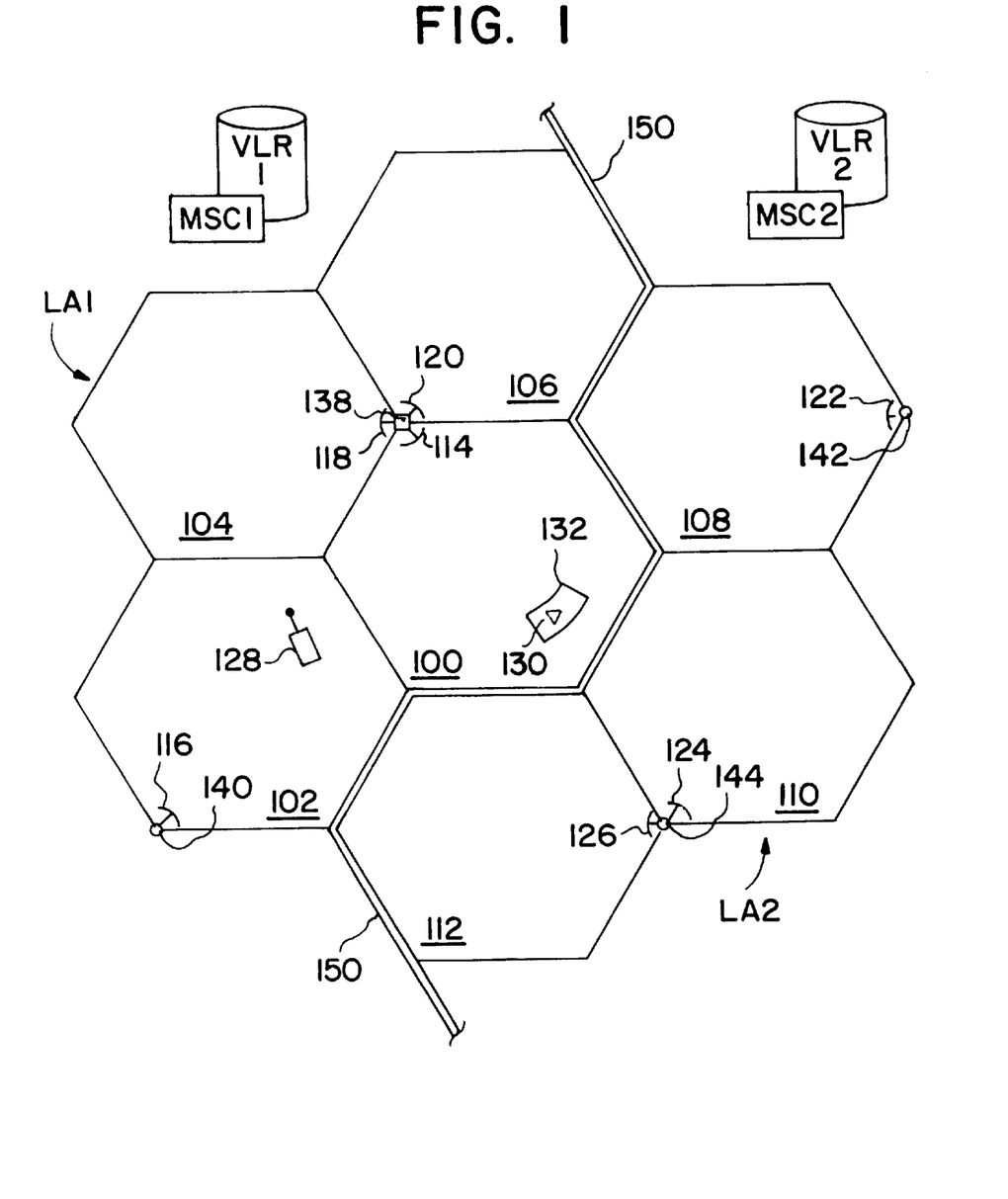
FIG. 1 illustrates an embodiment of the present invention implemented within a cellular system.

Referring now to FIG. 1, therein is illustrated an embodiment of the present invention implemented within a cellular system. FIG. 1 illustrates several cells, 100, 102, 104, 106, 108, 110, and 112, of the cellular system. The seven cells shown are chosen for illustration purposes, and the actual number of cells within the system may be more or less than seven in number. The system includes base station controllers (BSCs) 138, 140, 142 and 144. Each BSC 138, 140, 142 and 144 has one or more base transceiver stations (BTSs) connected to it and under its control. BSC 138 controls BTS 114, 118 and 120, BSC 140 controls BTS 116, BSC 142 controls BTS 122 and, BSC 144 controls BTS 124 and 126. Each BTS 114, 116, 118, 120, 122, 124 and 126, includes a receiver and transmitter for communicating with mobile stations or fixed subscriber stations located within cells 100–112. In FIG. 1 the base transceiver stations 114–126 are illustratively located near the periphery of each of the cells 100–112, respectively, and are equipped with 120 degree-directional antennas. However, in other configurations of the cellular radio system, base transceiver stations may be located near the center of the cells 100–112 and may illuminate the cells 100–112 with radio signals either omni-directionally or directionally. The cells shown in FIG. 1 are located on the border 150 between system location areas LA1 and LA2, with cells 100, 102, 104 and 106 being located in LA1 and cells 108, 110 and 112 being located in LA2. Base station controllers 138 and 140 are connected to a first mobile services switching center (MSC1). Base station controllers 142 and 144 are connected to a second mobile services switching center (MSC2). Each MSC and its associated BSCs controls system functions for the particular location area in which the BTSs connected to the associated BSCs are located.

One or more subscriber stations such as mobile station 128 and fixed station 130 may be located within cells 100–112 at any time. Each subscriber station is capable of communications over a radio interface with one or more of the base transceiver stations, and base station controllers and the mobile switching center connected to the base station controller. The radio interface comprises a plurality of traffic channels and at least one control channel. The control channel is used to control or supervise the operation of subscriber stations by information transmitted to and received from those stations. Such information may include incoming call signals, outgoing call signals, page signals, page response signals, location registration signals and voice or traffic channel assignments. MSC1 and MSC2 may be connected to a public switched telephone network (PSTN), not shown, or a similar fixed network that may include an integrated services digital network (ISDN) facility.

A mobile station such as mobile station 128 may move within a particular cell or, between cells or location areas of the cellular system while maintaining communications with the base stations of the system. A fixed subscriber's station such as fixed station 130 is restricted to operation within a fixed area assigned to the fixed subscriber. In FIG. 1 the invention operates to restrict fixed station 130 to operation in a fixed area 132 located within cell 100.

In an embodiment, the invention, as shown in FIG. 1, is implemented into a cellular system operating according to the European Global Systems for Mobile Communications (GSM) system standard. This standard is hereby incorporated by reference. While the GSM standard has been used to describe the embodiment, one skilled in the art will realize that the invention could be implemented into any cellular system that operates under principles similar to those of GSM.

Figure 2:
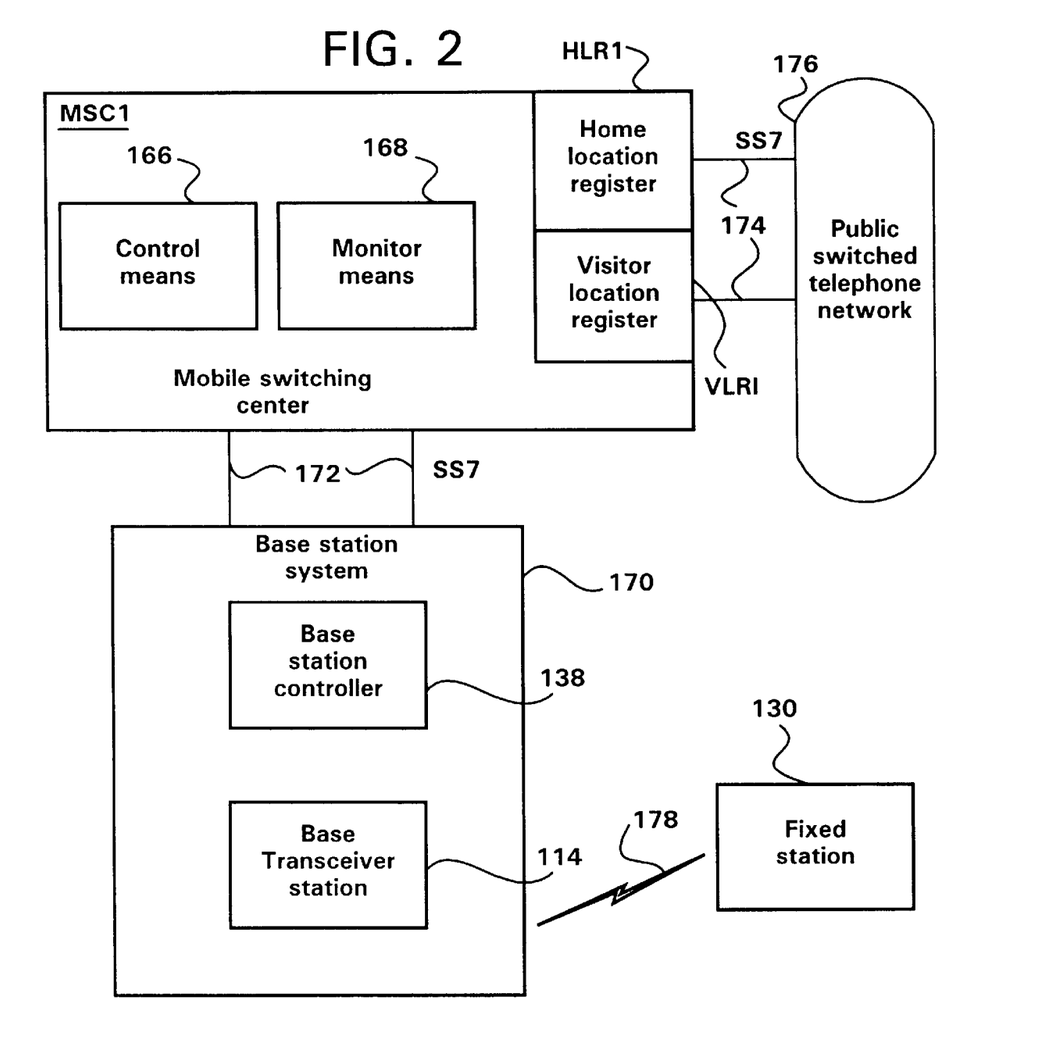
FIG. 2 is a block diagram of a cellular system implemented according to the teachings of the present invention.

Referring now to FIG. 2, therein is shown a block diagram of the invention as implemented in the cellular system of FIG. 1. Fixed station 130 communicates over RF interface 178 with base transceiver station (BTS) 114. Base station controller (BSC) 138 controls BTS 114. BSC 138 and BTS 114 comprise base station system (BSS) 170. BSS 170 is connected to and communicates with MSC1 over signaling lines 172 operating according to the signaling system no. 7 (CCITT no. 7) protocol. MSC1 comprises a home location register (HLR), a visitor location register (VLR), a control means 166 and a monitoring means 168. MSC1 is connected to and communicates with the public switched telephone network (PSTN) 176 over signaling lines 174 that operate according to the signaling system no. 7 (CCITT no. 7) protocol.

While, in this particular embodiment, control means 166 and monitor means 168 are shown to be located with MSC1, it will be understood by those skilled in the art that these particular functions may be located elsewhere in the system. For example, both or either of control means 166 and monitor means 168 may be located within the base station controller 138.

The restriction on fixed station 130 movement is accomplished by monitoring the actual location area identity (LAI) of the location area in which the fixed subscriber 130 is located, the actual timing advance (TA) value for the fixed subscriber's uplink and, an actual handover candidate cell list created for the fixed subscriber. The handover candidate cell list contains a list of neighboring cells that is ordered according to preference for handoff. The ordering of the list is determined by the location of the subscriber within the system. The monitored parameters are then compared with a fixed LAI, a TA maximum (T max) and TA minimum (T min) value, and a fixed handover candidate cell list stored within the fixed subscriber's profile in VLR1 of MSC1. If the fixed and actual LAIs differ, if the actual TA is not between TA max and TA min or, if a certain number or greater, of candidate cells, or the handover preference of cells, have changed between the actual and fixed handover candidate cell lists, a violation signal indicating the parameter change is sent to a control means 166. After one or more violation signals have been sent for a fixed subscriber in a particular period of time, the control means 166 may either alert the system operator or automatically terminate system access for fixed subscriber 130.

The fixed LAI, TA max and TA min values may be obtained by an initialization process upon the first power up of fixed station 130 in assigned area 132. The fixed handover candidate cell list may be initialized during the first call in which fixed station 130 is involved after power up within the system. The fixed LAIs, TA max and TA min and fixed handover candidate cell list may be obtained by utilizing functions of the cellular system. The actual LAIs, TAs, and handover candidate cell lists may also be obtained by utilizing the same functions.

The fixed and actual LAI values can be obtained by utilizing the registration and location update functions of the system. As part of the process of registration, the LAI value of the location area in which the subscriber station is located is updated and stored within the VLR of that subscriber. This happens upon initial system access when the subscriber station is powered on (attach updating) and, also, while the subscriber station is active in the system (during handover of a call or, during periodic or forced location updating caused by roaming). By accessing a subscriber's VLR at the appropriate time, a desired LAI value can be obtained.

The monitored TA values and, TA max and TA min, can be obtained by utilizing the GSM adaptive frame alignment process. In GSM each subscriber station active in a system is assigned a TA value. The TA value is used to align the TDMA data bursts transmitted by various subscriber stations, that are time division multiplexed on a single frequency channel. The adaptive frame alignment process assures that no two TDMA bursts overlap and interfere with each other. In GSM the TA value is a discrete value within the range of from 0 to 63. A TA of 0 corresponds to no timing advance and a TA of 63 corresponds to the maximum timing advance. The timing advance value increases as the mobile moves away from the base transceiver station and is indicative of the mobile station's distance from the base transceiver station. The maximum TA is 63. The base transceiver station measures the delay and sends the corresponding TA value to the mobile. A TA of 63 corresponds approximately to the delay of a signal received from a mobile station 35 km from the base transceiver station under static conditions.

A base transceiver station periodically sends frequency correction and synchronization signals on the broadcast control channel (BCCH) to enable the mobile station to synchronize itself to the base transceiver station and, if necessary, correct its frequency standard to be in line with that of the base transceiver station. The timing of time slots and frames containing the time slots are all related to a common set of counters which run continuously whether the mobile station or base transceiver station are transmitting or not. Once the mobile station has determined the correct setting of these counters, all processes are synchronized to the current serving base transceiver station.

The mobile station times its transmissions to the base transceiver station to be in line with those received from the base transceiver station. The base transceiver station continuously monitors the delay of the received signal from the mobile station at the base transceiver station. The base transceiver station then sends the timing advance (TA) parameter to each mobile. After receiving a TA value the mobile station advances its transmission timing by the amount of the TA, with the result being that signals from different mobile stations arrive at the base transceiver station compensated for propagation delay.

When the base transceiver station detects a random access burst on the control channel, it measures the delay of the signal relative to the expected signal from a mobile station at zero distance under static channel conditions. This delay called the initial TA is included in a response from the base transceiver station to the mobile station.

The base transceiver station thereafter continuously monitors the delay of a signal received from the mobile station. If the delay changes by a predetermined amount, the TA value is advanced or retarded by 1 and the new value signaled to the mobile station. Methods of measuring this timing advance (TA) are known to those skilled in the art.

In the invention the initial TA and each change of TA signaled by BTS 114 to fixed subscriber station 130 are also automatically signaled to monitoring means 168 of MSC1. The system then has available the TA values that are necessary to implement the invention.

The fixed and actual monitored handover candidate cell lists can be obtained by utilizing the GSM handover measurement process. As part of the handover measurement process, the mobile station receives and measures the downlink received signal level (RXLEV_NCELL) on the BCCH channels of neighboring cells at least 32 times over a period of 480 ms. The neighboring BCCH channels measured are determined by a neighbor frequency list sent by the system to the mobile station during a call. The neighbor frequency list includes no more than 16 neighbor cell BCCH channels to be measured. The measurement results for the 6 BCCH channels of neighboring cells having the strongest RXLEV_NCELL are then reported to the base station system by the mobile station every slow associated control channel (SACCH) multiframe (480 ms). The base station controller then uses the RXLEV_NCELL measurements to form a handover candidate list.

In the invention a handover candidate list is periodically generated and sent from BSC 138 to monitoring means 168 of MSC1. This handover candidate cell list can be utilized to create both the fixed handover candidate cell list and, the monitored handover candidate cell list.

In order to implement fixed cellular functionality for fixed subscriber 130, values for the fixed LAI, TA max and TA min and the fixed handover candidate cell list must first be initialized and then stored within the subscriber profile of fixed subscriber 130 in HLR1. These fixed parameter values may be initialized during the first power up of fixed subscriber 130. Fixed subscriber 130 is instructed by the system operator to power up when fixed station is located in its desired position. This would be within fixed area 132, as shown in FIG. 1.

Upon the initial power on of fixed subscriber 130 in the system, BTS 114 detects a random access burst on the control channel. As part of the access request the initial LAI identifying LAIL as the location area in which fixed subscriber 130 is currently located is sent to VLR1. This LAI is also stored within the subscriber profile of fixed subscriber 130 in HLR1 as the fixed LAI value for subscriber 130.

In an alternative of the invention, the fixed LAI may comprise more than one LAI value. The use of more than one LAI value for the fixed LAI would be useful when a fixed subscriber is located on or near the border of two or more location areas. In this case the current LAI of the fixed subscriber could vary even though the subscriber has not moved. If the fixed LAI value contained the LAIs of the bordering location areas the system could make a comparison of the one or more fixed LAIs with the current LAI and consider the fixed LAI and current LAI equal if the current LAI were equal to any LAI contained in the fixed LAI. This would prevent erroneous reports of fixed subscriber movement.

Upon initial power on BTS 114 also measures the initial timing advance. BTS 114 then sends the TA value to BSC 138 which transfers the value to monitoring means 168 within MSC1. From the TA initial value monitoring means 168 calculates TA max and TA min and places the values in the subscriber profile of fixed subscriber 130 in HLR1.

TA max and TA min may be calculated to allow a certain amount of change in the monitored TA values without considering fixed subscriber 130 as having moved beyond fixed subscriber area 132. As an example, if TA initial was 51, TA max may be set to 53 and TA min may be set to 49. The monitored TA values will fall within TA max and TA min as long as fixed subscriber 130 is approximately 1,000 meters along a line directed radially outward from BTS 114, in positions where the TA is 51. One skilled in the art will recognize that the TA value cannot be precisely predicted and calculated because of certain effects such as RF reflections off of trees, buildings and vehicles. In a rural area with large cell sites (up to 35 Km in diameter for GSM) the invention will provide more precise movement tracking than in suburban areas using smaller cells. TA max and TA min can be adjusted accordingly and the control means 166 and monitoring means 168 can also be implemented to account for these RF propagation effects.

The fixed handover candidate cell list for fixed subscriber 130 is initialized during the first call that fixed subscriber 130 is involved in. As the first call is ongoing, RXLEV_ NCELL measurements on neighbor cell measurement channels are performed according to the MAHO measurement process previously described. The handover candidate list is periodically sent from BSC 138 to monitoring means 168 within MSC1. During the first call, or as an alternative during a number of initial calls, monitoring means 168 receives the handover candidate lists. When enough handover candidate lists to achieve a desired accuracy have been collected, the fixed handover candidate cell list is defined. The handover candidate list can be defined as the list most frequently received during the initialization period. Depending on the differences in the lists received during the initialization period, if any, the criteria for the amount of change allowed in the handover candidate list can also be defined. The fixed handover candidate list is then stored within the subscribers profile.

Once the values for the fixed LAI, TA max and TA min and, the fixed handover candidate cell list are defined, the fixed cellular functionality control process can be implemented.

Figure 3A:
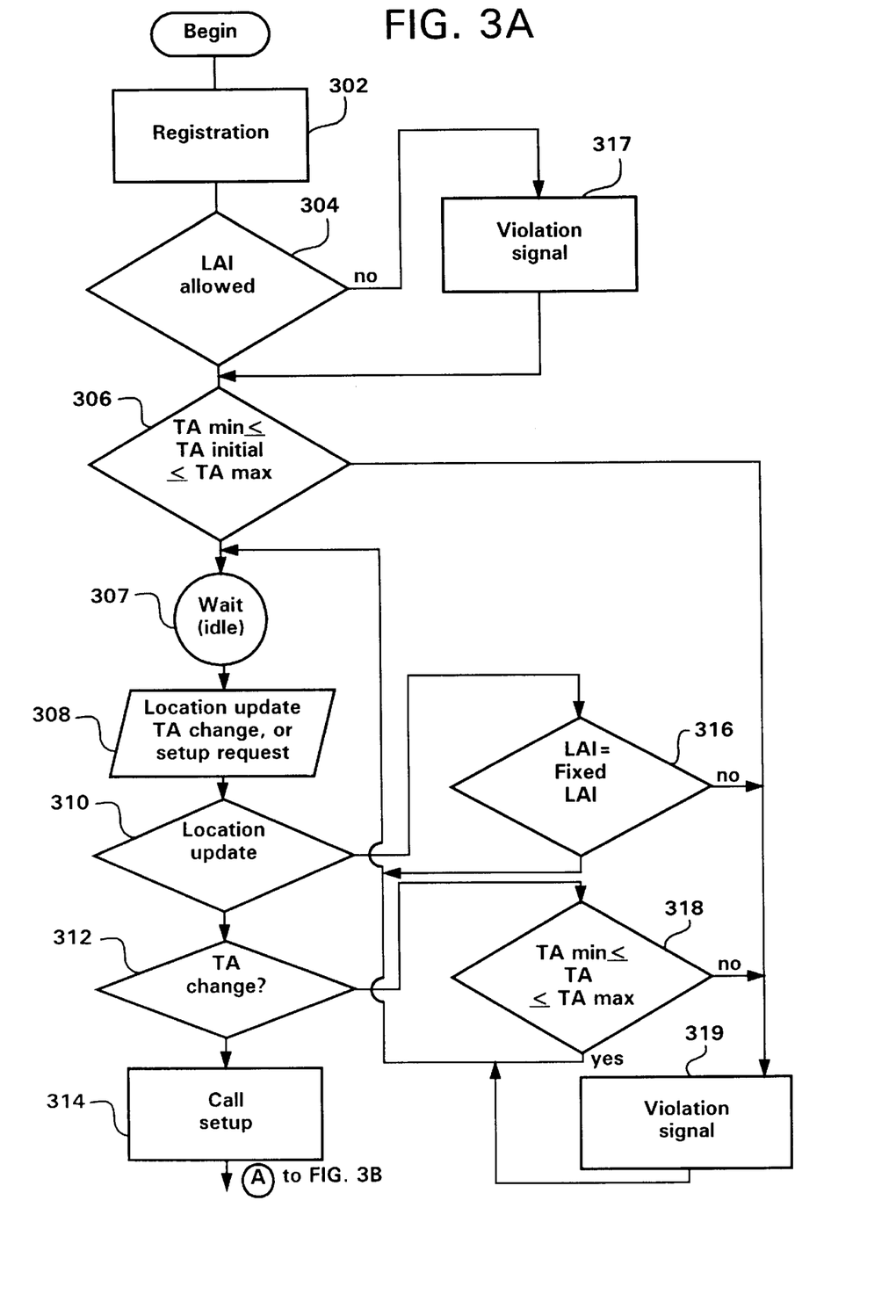
FIGS. 3A and 3B illustrate process steps followed by an embodiment of the method and apparatus of the invention.
Figure 3B:
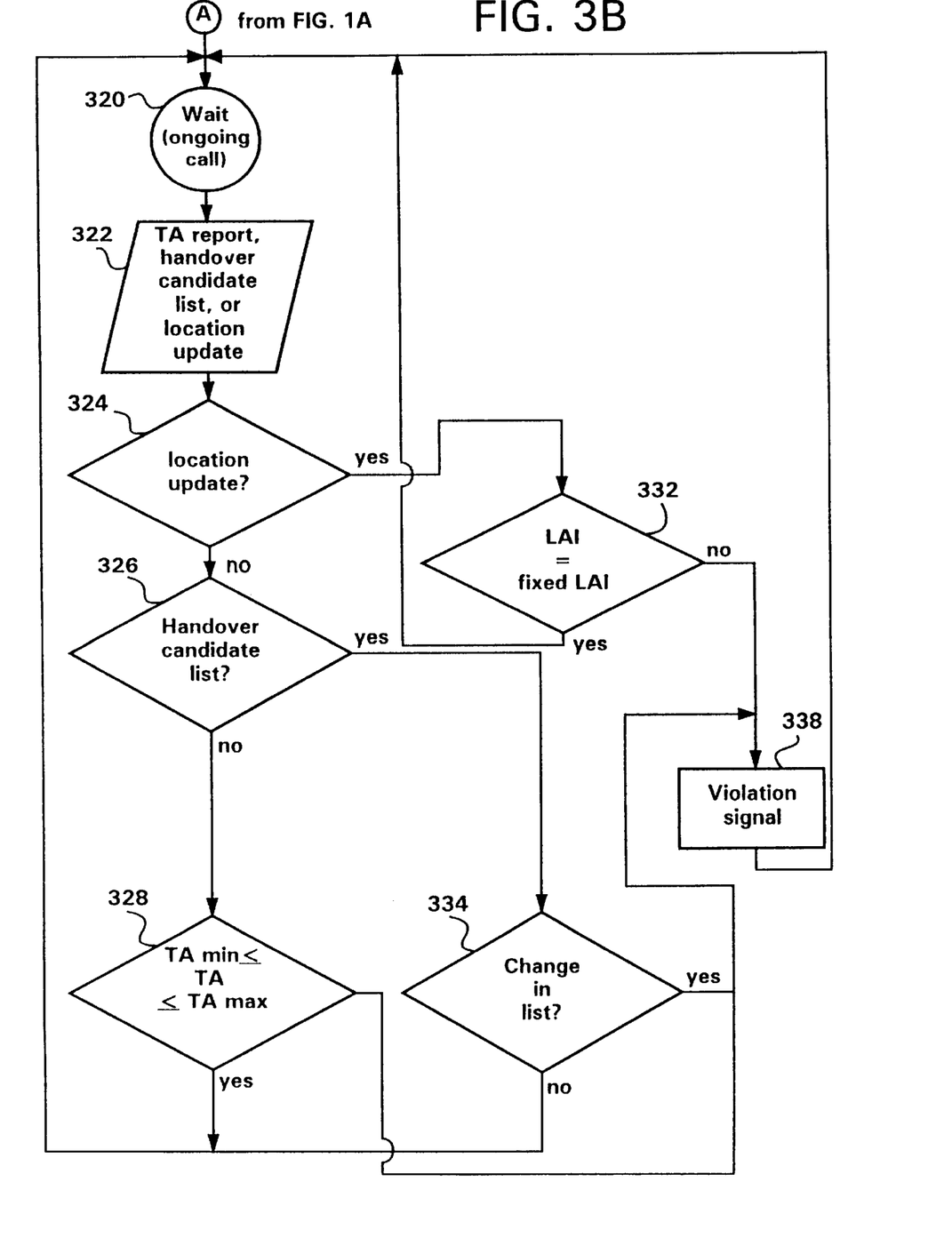

Referring now to FIGS. 3A and 3B therein are shown process steps performed within a cellular system operating according to the teachings of the present invention while a fixed subscriber is active in the system. The fixed subscriber is considered active for purposes of the invention when on and idle in the system or, when involved in an ongoing call. FIG. 3A illustrates process steps performed while the fixed subscriber station is on and idle. FIG. 3B illustrates process steps performed while the fixed subscriber station is involved in an ongoing call.

FIG. 3A illustrates the process steps that take place after initialization when fixed subscriber 130 powers up again after having powered down. If fixed subscriber 130 does not power down but remains on after initialization, the process would begin at step 307 of FIG. 3A rather than include steps 302, 304, 306 and 317. Until the fixed subscriber powers down, the fixed LAI, TA max and TA min and, the fixed handover candidate list remain stored in VLR1.

At step 302, upon power on, fixed station 130 registers in the system. As part of registration, the LAI of the location area in which fixed station 130 is located is sent to VLR1 of MSC1. The fixed LAI is also retrieved from the subscriber's profile which has been transferred from HLR1 and stored in VLR1. At step 304 the fixed LAI associated with fixed subscriber 130 is compared in monitoring means 168 with the actual LAI retrieved from the subscriber profile of fixed subscriber 130 stored in VLR1. If the fixed and actual LAI do not match the process moves to step 305. At step 305 the monitor means sends a violation signal to the control means 166. From step 317 the process moves to step 306. If however, the fixed and actual LAIs match at step 304, the process moves directly to step 306. Next, at step 306, monitoring means 168 compares the initial TA with the TA max and TA min values in the subscriber's profile. If the initial TA is not within the range set by TA max and TA min the process moves to step 319. At step 319 a violation signal is sent to control means 168. If however, at step 306 the initial TA is found to be within the range set by TA max and TA min, the process moves to the wait state of step 307.

While fixed station 130 is in the idle state, the process monitors and reacts to LAI updates, TA changes and setup requests. Either one of these three events will invoke the process to move from the wait state of step 307 to receive an input associated with the event at step 308. Next, at step 310 monitoring means 168 determines if the input is a location update request. If the input is a location update request the process moves to step 316 where the monitor means 168 compares the new LAI with the fixed LAI for fixed subscriber 130. If the LAI values are not equal the process moves to step 319 where monitoring means 168 sends a violation signal to control means 166. The process then returns to the wait state of step 307.

If however, at step 310, it is determined that the input is not a location update the process moves to step 312. At step 312 monitoring means 168 determines if the input is a TA change. If the input is a TA change the process moves to step 318 where monitoring means 168 compares the new TA with TA max and TA min for fixed subscriber 130. If the new TA is not within the range set by TA max and TA min the process moves to step 319 where monitoring means 168 sends a violation signal to control means 166. The process then returns to the wait state of step 307.

If however, at step 312 it is determined that the input is not a TA change, the process moves to step 114 where the system sets up a call. From step 312 the process moves to the wait state of step 320 in FIG. 3B.

While the fixed station 130 is involved in the ongoing call the process remains in the wait state of step 320. While in the wait state of step 320 the process will periodically monitor and react to TA changes, handover candidate list reports or location updates. Either one of those three events will invoke the process to move from the wait state of 320 to receive the input associated with the event.

Next, at step 324 monitoring means 168 determines if the input is a location update. If the input is a location update the process moves to step 332. At step 332 monitoring means 168 compares new LAI to fixed LAI. If the two LAI values differ the process moves to step 338 and monitoring means 168 sends a violation signal to control means 166. From step 338 the process then moves back to the wait state of step 320. If however, at step 332, it is found that the two LAI values are identical the process moves from step 332 directly back to the wait state of step 320. If however, at step 324, it is determined that the input is not a location update the process moves to step 326 where monitoring means 168 determines if the input is a handover candidate list. If the input is a handover candidate list, the process moves to step 334. At step 334 monitoring means 168 determines if there has been a significant change within the handover candidate cell list by comparing the actual handover candidate cell list with the fixed handover candidate cell list contained in the subscriber profile of fixed subscriber 130. A significant change is defined as a certain number N of the cells in the handover candidate cell list have either changed in position or dropped from the fixed list as compared to the actual list. If it is determined that there has been a significant change in the list the process moves to step 338 and monitor means 168 sends a violation signal to control means 166. From step 338 the process moves back to the wait state of step 320. If however, at step 336, it is found that the handover candidate cell lists are allowed, the process moves from step 336 directly back to the wait state of step 320.

If, at step 326, it is determined that the input is not a handover candidate list, a TA report has been received and the process moves to step 328. At step 326 monitor means 168 determines if the reported TA is within the bounds set by TA max and TA min. If the reported TA is not within the bounds set by TA max and TA min the process moves to step 338 where monitor means 168 sends a violation signal to control means 166. The process then moves back to the wait state of step 320. If however, at step 328, it is found that the reported TA is within the bounds set by TA max and TA min, the process moves from step 328 directly back to the wait state of step 320. The process shown in the flow diagram of FIG. 3B continues during the ongoing call.

Control means 166 may comprise a processor that is programmed to operate according to a desired algorithm on the violation signals received from monitoring means 168. For example, control means 166 may be programmed to deny system access or terminate an ongoing call after one or more violation signals of one type, or one or more violation signals forming a combination of violation types, are received. Depending on the desires of the system operator a single violation signal could be enough to deny access or terminate a call. The algorithm could be adjusted to account for variations within systems in RF effects that may cause erroneous violation signals.

In some instances a system operator may be granted a license that only allows the provision of fixed service. In this case allowing a fixed subscriber to roam would be a violation of the license by the operator. A function that automatically terminated a call or denied access would be useful to a system operator who has such a "fixed" license.

As an alternative, control means could instead generate a report to the system operator after one or more violation signals of one type, or one or more violation signals forming a combination of violation types, are received. The report could be received as a printout or on a monitor screen. The system operator could then use the reports to monitor a fixed subscribers system usage and decide to terminate service or, warn the subscriber of possible termination of service. The system operator could also use the reports as a basis for charging the subscriber special fees for violating a fixed subscriber service agreement.

As can be seen from the above description, the invention provides a method and apparatus for providing fixed telephony service in a cellular telecommunications system. The invention allows a system operator to restrict a fixed subscriber to a fixed area within a location area of a cellular system. This ability to restrict the fixed subscriber to a single area, smaller than a location area, provides more effective fixed cellular functionality than existing methods. The invention can also be implemented into an existing system with a minimum amount of modification to system equipment.

It is believed that the operation and construction of the present invention will be apparent from the foregoing description and, while the invention shown and described herein has been characterized as a particular embodiment, changes and modifications may be made therein without departing from the spirit and scope of the invention as defined in the following claims.

What is claimed is:

1. A method of providing fixed telephony services to a transmitting unit at a fixed subscriber location within a cellular network, said method comprising the steps of:

assigning at least one fixed subscriber parameter to only said transmitting unit, said at least one fixed subscriber parameter defining said fixed subscriber location;

monitoring one or more cellular parameters indicating if said transmitting unit has moved from said fixed subscriber location, said fixed subscriber location comprising a portion of a coverage area of a base station that is not centered on the base station, said transmitting unit being in wireless communication with said base station within the cellular network;

comparing said one or more cellular parameters with said at least one fixed subscriber parameter to determine if said transmitting unit has moved from the fixed subscriber location; and, in response to an affirmative determination:

generating an indication that the transmitting unit has moved beyond said fixed subscriber location.

2. An apparatus for providing telephony service to a transmitting unit at a fixed subscriber location within a cellular network, comprising:

a base station within the cellular network;

a fixed subscriber station in wireless communication with said base station, said fixed subscriber station assigned to operate at the fixed subscriber location, the fixed subscriber location comprising a portion of the coverage area of said base station that is not centered on the base station;

means associated with the base station, for monitoring a first set of cellular parameters indicative of said fixed subscriber station's position within the coverage area of the base station, said fixed subscriber location comprising only a portion of the coverage area of the base station; and control means for determining when the first set of cellular parameters do not match any one of a second set of cellular parameters assigned to only said fixed subscriber station, said second set of cellular parameters defining the fixed subscriber location, and discontinuing telephone service in response thereto.

3. The apparatus of claim 2 in which said first set of cellular parameters includes a handover candidate list.

4. The apparatus of claim 2 in which said first set of cellular parameters includes a timing advance value.

5. The apparatus of claim 2 in which said first set of cellular parameters includes a location area identity.

6. The apparatus of claim 2 further comprising means for storing the second set of cellular parameters.

7. The apparatus of claim 2 in which said second set of cellular parameters include each of a handover candidate list, a timing advance value and a location area identity.

8. The apparatus of claim 2 further comprising means for generating a signal in response to a determination, made within said means for determining, that said fixed subscriber is not located within said fixed area.

9. The method of claim 1 wherein the cellular parameters comprise a handover candidate list, the handover candidate list comprising a listing of cells neighboring a cell containing the transmitting unit.

10. The method of claim 9 wherein said at least one fixed subscriber parameter comprises a standard handover candidate list, and wherein the step of comparing comprises the step of comparing the handover candidate list of the transmitting unit with the standard handover candidate list, the standard handover candidate list containing a listing of neighboring cells when the transmitting unit is at the first subscriber location.

11. The method of claim 1 wherein the cellular parameters comprise a timing advance value, the timing advance value indicating an amount of timing advance necessary to achieve signal synchronization between a mobile station and a base station.

12. The method of claim 11 wherein said at least one fixed subscriber parameter comprises a predetermined range of timing advance values, and wherein the step of comparing comprises the step of comparing the timing advance value to the predetermined range of timing advance values to determine if the timing advance value falls within the predetermined range.

13. The method of claim 1 wherein the cellular parameters comprise a location area identity in which the transmitting unit is located.

14. The method of claim 13 wherein said at least one fixed subscriber parameter comprises a predetermined location area identity associated with the fixed subscriber location, and wherein the step of comparing comprises the step of comparing the location area identity with the predetermined location area identity.

15. The method of claim 1 further including the step of notifying a controller of movement of the transmitting unit from the fixed subscriber location.

16. A method for providing telephone services to a transmitting unit at a fixed subscriber location within a cellular network, comprising the steps of:

monitoring a first set of parameters comprising a location area identifier, a timing advance value and a handover candidate list, the first set of parameters associated with a present location of the transmitting unit;

comparing the first set of parameters to a predetermined second set of parameters comprising a fixed location area identifier, a fixed timing advance value range and a fixed handover candidate list, the predetermined second set of parameters being assigned to only said transmitting unit and defining the fixed subscriber location, the fixed subscriber location comprising a portion of a coverage area of a cell within the cellular network that is not centered as a transceiver for the cell; and generating an indication that the transmitting unit has moved from the fixed subscriber location if any of the first set of parameters do not match the predetermined second set of parameters.

17. The method of claim 16 further including the step of establishing the predetermined second set of parameters during initial power up of the transmitting unit.

18. The method of claim 16 further including the step of notifying a controller of movement of the transmitting unit from the fixed subscriber location.

19. The method of claim 16 further including the step of terminating telephone services to the transmitting unit upon movement of the transmitting unit from the fixed location.

* * * * *

UNITED STATES PATENT AND TRADEMARK OFFICE
CERTIFICATE OF CORRECTION

PATENT NO. : 5,905,950
DATED : May 18, 1999
INVENTOR(S) : Anell

It is certified that error appears in the above-identified patent and that said Letters Patent is hereby corrected as shown below:

Column 1, line 6   Replace "08/508,531"
With --08/501,531--

Column 8, line 10   Replace "LAIL"
With --LAI1--

Signed and Sealed this

Twenty-third Day of May, 2000

Attest:

Q. TODD DICKINSON

*Attesting Officer*   *Director of Patents and Trademarks*